July 22, 1924.

J. B. VIDACK

VEHICLE SPRING

Filed May 16, 1923

1,502,602

John B. Vidack
INVENTOR

BY Victor J. Evans
ATTORNEY

WITNESS:

Patented July 22, 1924.

1,502,602

UNITED STATES PATENT OFFICE.

JOHN BATTISTA VIDACK, OF CHICAGO, ILLINOIS.

VEHICLE SPRING.

Application filed May 16, 1923. Serial No. 639,392.

*To all whom it may concern:*

Be it known that I, JOHN B. VIDACK, a citizen of the United States, residing at Chicago, in the county of Cook and State of Illinois, have invented new and useful Improvements in Vehicle Springs, of which the following is a specification.

The object of this invention is to provide a spring for vehicles, of greatly increased efficiency, as compared with many of the springs commonly employed.

Another object is to provide, in connection with upper and lower springs, a plurality of shorter or supplementary leaf springs, to be positioned between the springs first named, and to employ particular means for connecting the springs with each other.

A still further object is to provide an upper leaf spring and mounting means therefor, a lower leaf spring reversely positioned, devices connecting the ends of the springs, and additional springs, reversely arranged, connected with each other, and connected with the devices by which the ends of the first and second named springs are secured together.

With the foregoing and other objects in view, the invention consists in the novel construction and arrangement of elements described and claimed, it being understood that modifications may be made within the scope of the claim without departing from the spirit of the invention.

Figure 1:
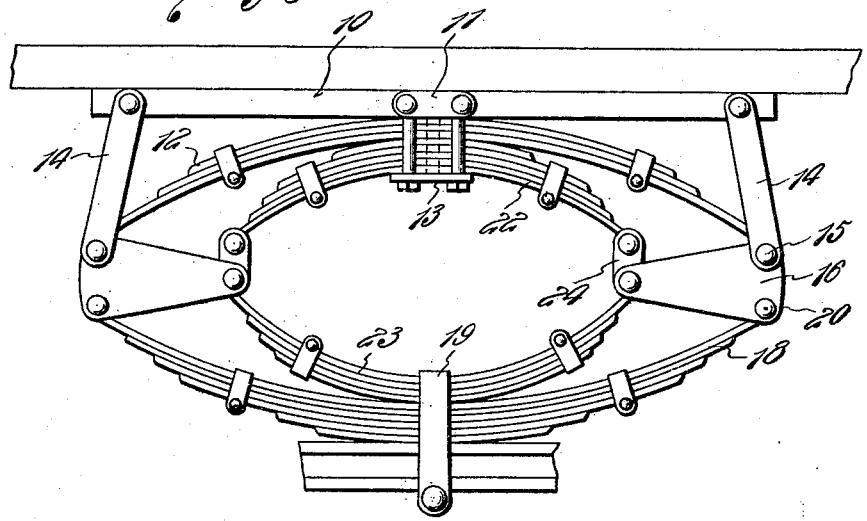
Figure 2:
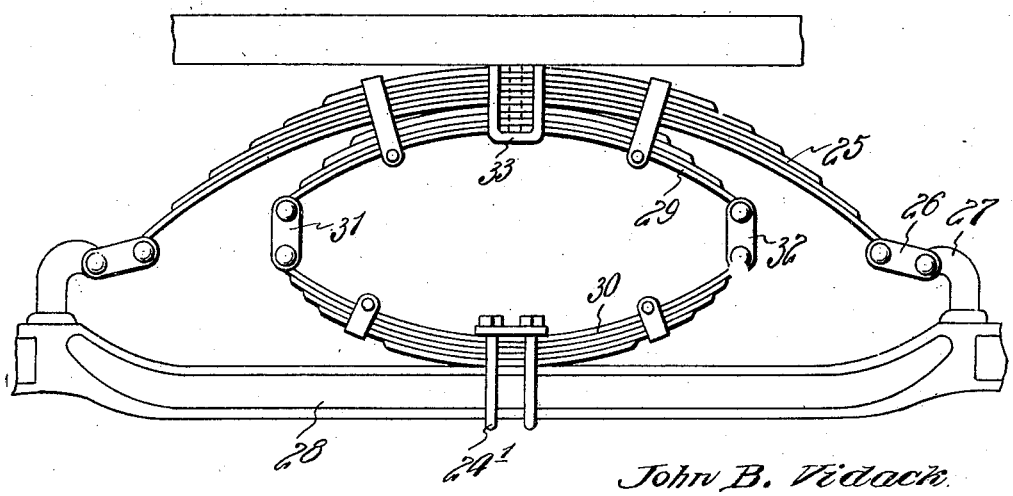

In the drawings, Figure 1 shows the device in side elevation, and Figure 2 is a similar view of another form.

An element having the form of a plate, bar, or the like, is designated 10, and is designed to be secured to the frame or body of a vehicle by bolts 11. An upper main leaf spring 12 is mounted on the element 10 by means of a clamp 13, and plates, bars, or shackles 14 are pivotally connected with the ends of the element 10 and with bolts 15 passing through the elements, braces or plates 16 which may be of approximately triangular form. A main leaf spring 18 is to be connected with a vehicle axle by means of clamp 19 and its ends are pivotally connected by bolts 20 with plates 16, opposite the point of connection of elements 14 with said plate.

Two supplemental or inner and shorter leaf springs 22, 23, are reversely arranged with reference to each other, and are connected with plates 16 and with each other by shackles 24. The clamps 13 and 19 also engage springs 22, 23 in the manner shown.

This arrangement is especially durable and adds greatly to the comfort of the occupants of a motor car, railway car, or other vehicle, and usually renders the use of independent shock absorbers unnecessary.

Another form of the device contemplates the use of a main spring 25 connected by the shackles 26 with perches 27 mounted on the axle 28. The supplementary springs are designated 29 and 30, and are pivotally connected by devices 31 and 32.

The supplementary springs in this form have the relation shown with reference to each other, and with reference to the main springs, clamps 33 securing the supplementary springs to the main frame and to a stationary element, and the clamp 24' securing the other supplementary spring to the axle.

What is claimed is:—

A device of the class described, comprising upper and lower main leaf springs, reversely arranged, shackles pivoted to the ends of one of the springs, plates pivoted to the shackles and to the other spring and extending inwardly from the point of connection, supplementary leaf springs positioned between those first named, shackles pivoted to the innermost ends of the plates, and to the adjacent ends of the supplementary springs and devices connecting the central portions of the supplementary springs, respectively with one of the main springs.

In testimony whereof I affix my signature.

JOHN BATTISTA VIDACK.